United States Patent [19]

Shimamori et al.

[11] Patent Number: 5,535,180
[45] Date of Patent: Jul. 9, 1996

[54] MAGNETO-OPTICAL TAPE RECORDING AND READING-OUT METHOD INVOLVING RUNNING TAPE IN FRONT OF AT LEAST A SINGLE POLE OF A MAGNET TO INITIALIZE OR ERASE INFORMATION

[75] Inventors: Takumi Shimamori; Naoyuki Uchida, both of Yokohama, Japan

[73] Assignee: Mitsubishi Chemical Corporation, Tokyo, Japan

[21] Appl. No.: 349,373

[22] Filed: Dec. 5, 1994

[30] Foreign Application Priority Data

Dec. 8, 1993 [JP] Japan .................... 5-308008

[51] Int. Cl.⁶ .................................. G11B 11/00
[52] U.S. Cl. ................. 369/13; 369/14; 369/110
[58] Field of Search .................. 369/13, 14, 15, 369/110, 273, 275.2; 360/59, 114, 103, 106, 108

[56] References Cited

U.S. PATENT DOCUMENTS

| | | | |
|---|---|---|---|
| 4,525,828 | 6/1985 | Higashiyama et al. | 369/13 |
| 4,594,699 | 6/1986 | Browder | 369/13 |
| 4,970,707 | 11/1990 | Hara et al. | 369/44.11 |
| 5,070,487 | 12/1991 | Watson | 369/13 |
| 5,278,810 | 1/1994 | Takahashi et al. | 369/13 |
| 5,325,344 | 6/1994 | Ohta et al. | 369/13 |
| 5,392,181 | 2/1995 | Lhureau et al. | 360/114 |

FOREIGN PATENT DOCUMENTS

| | | |
|---|---|---|
| 0229395 | 7/1987 | European Pat. Off. . |
| 1242268 | 6/1967 | Germany . |
| A3011036 | 10/1980 | Germany . |
| 926833 | 5/1963 | United Kingdom . |

OTHER PUBLICATIONS

"Thermomagnetic Recording and Erasure", *IBM Technical Disclosure Bulletin*, Feb. 1973, vol. 15, No. 9, pp. 2747–2748.

*Patent Abstract of Japan*, Nov. 12, 1993, vol. 17, No. 616 (P–1643), 5–189 829.

*Patent Abstract of Japan*, Feb. 16, 1985, vol. 9 No. 37 (P–335), 59–178,602.

*Primary Examiner*—Tan Dinh
*Attorney, Agent, or Firm*—David G. Conlin; Kevin J. Fournier

[57] ABSTRACT

A magneto-optical recording and readout method involves making a tape-type magneto-optical recording medium run in front of at least a single pole of a permanent magnet or an electromagnet at a position forwards of an optical head relative to the running direction of the recording medium, without contacting the magnet so as to cross at a substantial right angle to magnetic force lines, thereby initializing the recording medium or erasing information therein. The tape-type magneto-optical recording medium has at least a magneto-optical recording layer on one side of a base film having a thickness of not more than 50 μm. Recording of information is effected by irradiating beams to the recording medium under application of an external magnetic field of not more than 24 kA/m.

6 Claims, 2 Drawing Sheets

MAGNETO-OPTICAL TAPE RECORDING AND READING-OUT METHOD INVOLVING RUNNING TAPE IN FRONT OF AT LEAST A SINGLE POLE OF A MAGNET TO INITIALIZE OR ERASE INFORMATION

BACKGROUND OF THE INVENTION

The present invention relates to a magneto-optical recording and reading-out method. More particularly, the present invention relates to a magneto-optical recording and reading-out method comprising irradiating beams to a tape-type re-writable and erasable magneto-optical recording medium having at least a magneto-optical recording layer on one side of a base film (substrate) having a thickness of not more than 50 μm.

With increase of the amount of information in recent years, there is a strong request for an information recording and readout system which is capable of compact recording, storage and stable retention of massive amount of information from various sources such as documents, pictures and sounds.

Magneto-optical recording has a feature such as high storage capacity per unit area, i.e., high area storage density owing to use of beams closed down to the threshold of diffraction of approximately 1 μm.

The conventional disc-type magneto-optical recording medium has an advantage that it is capable of random access to the recorded signal. Also, in this magneto-optical recording medium, since beams are irradiated to the magnetic layer via a transparent substrate having a thickness of approximately 1.2 mm, the dust and flaws on the irradiated surface of the substrate can hardly become a cause of error.

However, the disc-type magneto-optical recording medium is not high in storage capacity per unit volume, i.e., volume storage density, because of the relatively large thickness (1.2 mm) of the substrate. Even if the substrate is reduced in thickness for elevating the volume storage density, no drastic improvement of the volume storage density can be expected as far as the recording medium has a disc-like shape because the cartridge housing of the disc-type recording medium is incapable of extreme reduction of thickness.

In the case of magnetic tape, it is possible to significantly elevate the volume storage density owing to the structural features that the substrate can be reduced in thickness and the tapes can be housed in winding in a cartridge.

A tape-type magnetic recording medium is applied to digital video recording, etc., but its memory capacity is not remarkably large since the area storage density thereof is not so high as optical disc. Also, the tape-type magnetic recording medium is small in coercive force and high in saturation magnetization as compared with the disc-type magneto-optical recording medium, so that the tapetype recording medium has the problem that when it is rolled up and kept in storage for a long time, there may take place transfer of recording to cause deterioration of the recorded signal.

A write-once optical tape has been developed as a recording medium which has both the advantage of optical disc of being high in area storage density and the advantage of magnetic tape of being high in volume storage density. This medium such as write-once optical tape is remarkable for its high recording density and excellent storage stability, but it is merely capable of write-once and incapable of rewriting unnecessary information. Therefore, in case where an information becomes useless, the whole recording medium storing such information is treated as useless things. This becomes a problem not only from the aspect of economy but also from the viewpoint of waste disposal.

The magneto-optical recording system can be roughly divided into two types. One is a light intensity modulation in which magnetization of the medium is preset in one direction and recording is carried out by modulating the light irradiation intensity while applying a bias magnetic field in the opposite direction, and the other is a magnetic field modulation in which recording is conducted by modulating the direction of the magnetic field without modulating the light intensity.

In the magnetic field modulation, since the magnetization must be switched to high speed, it is necessary to miniaturize the magnetic head which generates the magnetic field and to position it closer to the recording medium.

However, in the recording of the magneto-optical tape, movement of the recording medium is relatively low in speed while the recording head is moved at high speed unlike disc recording, so that it is difficult to realize practical application of a recording method which requires high speed access of the magnetic head, such as the magnetic field modulation.

In the light intensity modulation, a process for arranging magnetization of the recording medium in one direction, that is, erasing or initialization is required before recording.

For example, in the case of magneto-optical disc, erasing is effected by continuous irradiation of beams while exerting a magnetic field in the direction opposite to the bias magnetic field for recording.

It is possible to conduct, also, the erasing treatment of magneto-optical tape, but the tape must be moved at high speed for effecting recording soon after erasing. This is actually impractical.

Thus, for recording and reading-out a rewritable tape-type magnetic recording medium by irradiating beams thereto, a recording and readout system of a magneto-optical tape capable of compact recording, storage and stable retention of massive information and also capable of as several times of rewriting has been required.

In view of the above, the present inventors pursued intensive studies for providing an information recording and readout system capable of realizing a very high volume storage density and re-writable on a tape-type magnet-optical recording medium, and as a result, the present inventors have found that by effecting initialization of a tape-type magneto-optical recording medium and erasing of information in the recording medium by a specified method, that is, making the recording medium run in front of at least the single pole of a permanent magnet or electromagnet without contacting the magnet, crossing at a substantial right angle to magnetic force lines, an excellent magneto-optical recording and readout system can be realized. The present invention has been attained on the basis of this finding.

SUMMARY OF THE INVENTION

An object of the present invention is to provide an information recording and readout system using a tape-type magneto-optical recording medium capable of compact recording, storage and stable retention of massive information and also capable of as several times of rewriting as desired.

Another object of the present invention is to provide an information recording and readout system of a high volume storage density, capable of compact recording and storage of massive information of various forms such as documents, pictures, sounds and numerical data.

To accomplish the aims, in an aspect of the present invention, there is provided a magneto-optical recording and reading-out method which comprises making a tape-type magneto-optical recording medium run in front of at least a single pole of a permanent magnet or an electromagnet at a position forwards of an optical head relative to the running direction of said recording medium, without contacting said magnet so as to cross at a substantial right angle to magnetic force lines, thereby initializing said recording medium or erasing information therein, said tape-type magneto-optical recording medium having at least a magneto-optical recording layer on one side of a base film (substrate) having a thickness of not more than 50 µm; and effecting recording of information by irradiating beams to the recording medium under application of an external magnetic field of not more than 24 kA/m.

DETAILED DESCRIPTION OF THE INVENTION

Figure 1:
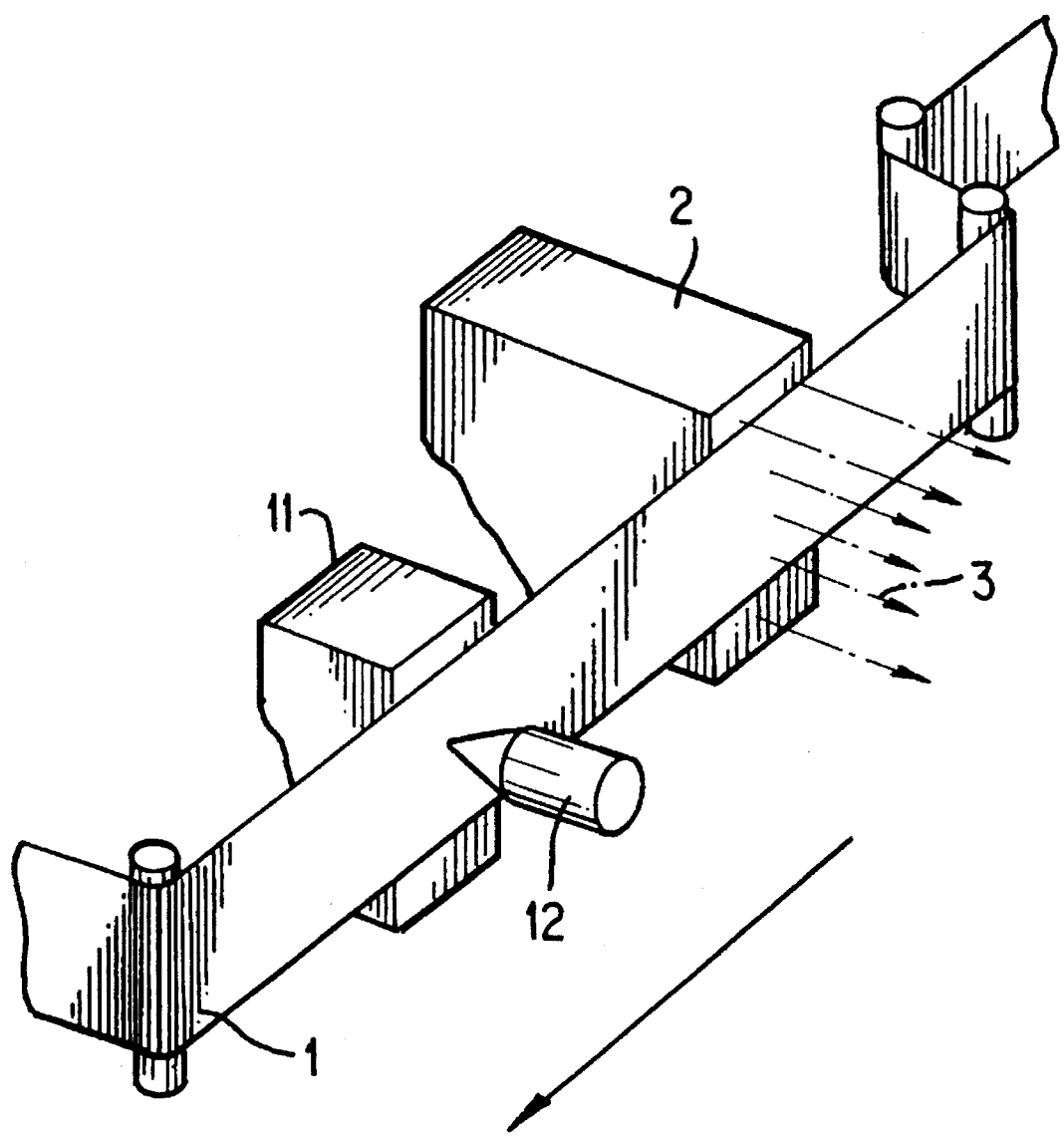
FIG. 1 is a diagrammatic illustration of the initialization or erasing step in the magneto-optical recording and readout method according to the present invention.

The gist of the present invention lies in a magneto-optical recording and reading-out method in which recording and readout are conducted by irradiating beams to a tape-type magneto-optical recording medium having at least a magneto-optical recording layer on a substrate having a thickness of not greater than 50 µm, which comprises effecting initialization of the recording medium or erasing of information in the recording medium by simply applying a magnetic field without using beams, at a position forwards of an optical head relative to the running direction of the recording medium.

The substrate of the magneto-optical recording medium used in the present invention serves for supporting a magneto-optical recording layer thereon. The thickness of the substrate can not be reduced beyond a certain limit because of the possibility that the recording medium might be stretched out by the tension built up when the tape is rolled up, but for increasing the volume storage density of the medium, the substrate thickness should be not more than 50 µm, preferably not more than 20 µm, more preferably 1 to 20 µm.

As the substrate used in the present invention, there can be used a monolayered polyester film and a multilayered polyester film.

A tensile strength upon 5% elongation ($F_5$ value) in the longitudinal direction of the substrate used in the present invention is preferably not less than 6 kg/mm², more preferably not less than 8 kg/mm², still more preferably not less than 10 kg/mm². When the $F_5$ of the substrate in its longitudinal direction is less than 6 kg/mm², the handling workability of the optical tape may be deteriorated and the optical tape may prove unsatisfactory in durability. The $F_5$ value in the present invention is measured by the following method.

A specimen substrate of 50 mm in length and 15 mm in width was pulled at a rate of 50 mm/min in a room adjusted to a temperature of 23° C. and a humidity of 50% RH by using a tensilon tester Intesco Model 2001 (manufactured by Intesco Co. ), and the strength at 5% elongation was defined as $F_5$ value.

The heat shrinkage of the substrate used in the present invention in its longitudinal direction (machine direction) after 30 minute heat-treatment at a temperature of 100° C. is preferably not more than 5%, more preferably not more than 3%, still more preferably not more than 2%. In case such heat shrinkage exceeds 5%, the heat resistance may become unsatisfactory to afford adverse effect on the properties of the produced optical tape. The heat shrinkage in the present invention is measured by the following method.

By using a circulating hot-air oven (manufactured by Tabai Seisakusho, Ltd.), the sample substrate was subjected to a free end heat treatment at a temperature of 100° C. for 30 minutes, and the dimensional change in the longitudinal direction (machine direction) of the substrate after the heat treatment was expressed by %.

In the substrate used in the present invention, it is desirable that the surface (A surface) of the substrate on the magneto-optical recording layer side is as flat and smooth as possible.

A center line average roughness ($Ra^A$) on the A surface of the optical recording layer side of the substrate is not more than 0.005 µm, preferably not more than 0.003 µm, more preferably not more than 0.002 µm. When the $Ra^A$ exceeds 0.005 µm, the optical recording performance may lower.

The center line average roughness ($Ra^B$) on the exposing surface (B surface) of the substrate, which is a side opposite to the magneto-optical recording layer, is within the range of 0.005 to 0.3 µm, preferably 0.007 to 0.05 µm, more preferably 0.008 to 0.02 µm. When the $Ra^B$ is less than 0.005 µm, it is difficult that the slipperiness of the substrate is improved sufficiently, resulting in unsatisfactory workability of the substrate. On the other hand, when the $Ra^A$ exceeds 0.3 µm, there may be induced adverse effects such as transfer of roughness to the smooth surface of the substrate.

The center line average roughness in the present invention is measured by the following method.

The center line average roughness on the surface of the substrate was determined as follows by using a surface roughness apparatus (SE-3F) [manufactured by Kosaka Institute Co.]. That is, a portion of a sampling length L (2.5 mm) was sampled in the direction of the center line from a film cross sectional curve. The center line average roughness (Ra) is represented by determining ten cross sectional curves from the surface of the specimen film and expressed by an average value for the center line roughness of the sampled portion determined from the cross sectional curves. Further, the tip radius of the stylus was 2 µm, the load was 30 mg and the cut-off value was 0.08 mm.

It is also preferable to use a substrate showing a high heat resistance of at least about 100° C. since the recording layer is heated up to around 200° C. by the recording beams when recording is conducted.

A polyethylene terephthalate (PET) film or a polyethylene naphthalate (PEN) film is preferably used as the substrate.

Since such a film is produced by a drawing method, the phenomenon of birefringence may take place, and when beams is passed through a material in which the said phenomenon has occurred, the magneto-optical effect of the medium is substantially reduced. Therefore, in readout of signal in the present invention, it is preferable that beams be irradiated not through the substrate but directly to the magneto-optical recording layer on the substrate.

The tape-type magneto-optical recording medium used in the present invention has at least a magneto-optical recording layer formed on the substrate. This magneto-optical recording layer serves for storing signals by thermo-magnetic recording and reading-out signals by virtue of magneto-optical effect. In thermo-magnetic recording, it is required that the coercive force of the magneto-optical recording layer at high temperatures is sufficiently lower than that at around room temperature. Also, for reading-out by magneto-optical effect, it is required that the magneto-optical effect of the magneto-optical recording layer is high enough, that is, the Kerr rotation angle or the Faraday rotation angle is large.

A typical example of the magnetic material that can satisfy these requirements is amorphous alloys of rare earth and transition metals. The thickness of the magneto-optical recording layer is 5 to 100 nm.

On the substrate, there may be provided, beside the said magneto-optical recording layer, a 20 to 300 nm thick-light interference layer made of a dielectric material and/or a 10 to 100 nm thick-light reflective layer made of a metal.

A protective layer for protecting these thin films from environmental and mechanical impact may also be provided. The protective layer is made of an ultraviolet curing resin or a fluorine resin and its thickness is not more than 10 μm. Further, the protective layer is a transparent film having a refractive index of 1.1 to 1.7 and a surface roughness (center line average roughness) of not more than 10 nm, preferably not more than 5 nm.

On the surface of the magneto-optical recording medium is formed unevenness by a known method, for example the method disclosed in Japanese Patent Application Laid-Open (KOKAI) Nos. 56-84921, 3-53924, 5-159384 and 6-12707.

For obtaining the signals, there can also be employed a method using phase difference of laser beams by availing of fine unevenness of the track grooves on the substrate, the fine unevenness being produced by physically transferring unevenness previously provided to a roll to the substrate in the course of film formation. The unevenness on the whole surface of the medium is used for a tracking signal of laser beams and the unevenness on the both ends in the transverse direction of the medium is used for an address signal or a controlling signal of medium running speed.

The type of signal to be written in the medium also includes magnetic signal, magneto-optical signal, optical signal (signal using the difference of reflectance) and electrical signal. For obtaining the signal using difference of reflectance, there can be employed, for example, a method utilizing phase change of crystals by irradiating laser beams.

The signal for controlling the running speed is generated, for instance, by the fine unevenness, or the other type of signal provided at equal intervals with a spacing of several to hundreds of microns on both ends in the transverse direction of the medium.

In the present invention, in recording of information, it is necessary to previously perform erasing for making uniform magnetization of the recording medium in one direction.

In the conventional magneto-optical discs, erasing is effected by using both light and magnetization, but in the magneto-optical recording and reading-out method according to the present invention, erasing is performed by using only a magnetic field prior to recording, specifically, as shown in FIG. 1, by making the tape 1 run in front of at least a single pole of a permanent magnet 2 or an electromagnet, preferably between both poles thereof considering leakage field, so as to cross at a substantial right angle to magnetic force lines 3 without contacting the said magnet. "Non-contact run" of the medium in the present invention means that the medium is made run in front of a magnet keeping a spacing of 0.01 to 20 mm therefrom.

In the case of magneto-optical disc, since the recording medium is rotated on a track, it is impossible to effect erasing of the medium by use of a magnetic field alone because in this case, the just recorded signal, too, is erased.

On the other hand, in the case of magneto-optical tape, since the recording medium is moved rectilinearly, even if erasing is effected by use of a magnetic field alone at a position forwards of the optical head for recording, the recorded section never returns to the position of the erasing head.

In the case of magneto-optical tape, since the recording medium is not turned, it is difficult to effect erasing and recording with a same optical head as the case of magneto-optical disc.

For these reasons, it is more rational to effect erasing of magneto-optical tape by use of a magnetic field alone at a position forwards of the optical head relative to the direction of tape run.

It is preferable for simplification in structure of the apparatus that the magnetic field for effecting erasing or initialization of the recording medium be applied so that it may be exerted to the whole breadth of the optical tape. Use of a permanent magnet is preferred in terms of power consumption.

The magnetization to be applied is not more than 640 kA/m, preferably 40 to 640 kA/m. This range of the applied magnetization is selected as it is possible to reduce the size of the magnet used for generating the magnetic field.

The permanent magnet used for erasing in the present invention is preferably one whose maximum value of energy product $(BH)_{Max}$ is large. Examples of such permanent magnet are RCo magnet (wherein R represents a rare earth element) and NdFeB sintered magnet.

Permanent magnet may be provided either at a single position or at plural positions as far as all the magnets are disposed in one magnetic circuit. For example, a pair of magnets may be disposed in opposition to each other with a gap therebetween, with their poles distant from the gap being connected by a yoke.

Considering the leakage field, it is recommended to use yoke-type permanent magnets.

The magnetic properties required for the yoke material are high permeability and high saturation flux density. When using a permalloy as yoke material, it is possible to obtain a maximum permeability (μm) of not less than 0.01 H/m. Amorphous magnetic alloys containing transition metals are usable.

FeCo alloys are suited for yoke material because of high maximum permeability (μm=0.006 H/m) and high saturation flux density (2.4 Wb/m$^2$).

Figure 2A:
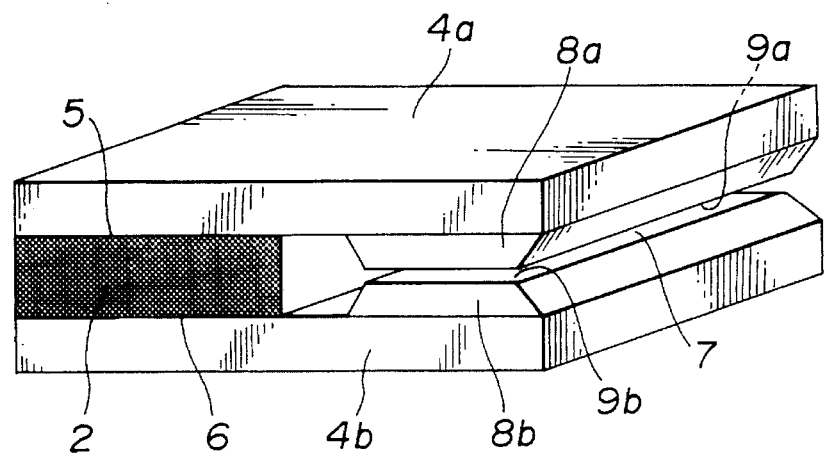
FIG. 2(a) and FIG. 2(b) show typical examples of yoke-type permanent magnet used in the magneto-optical recording and readout method according to the present invention.
Figure 2B:
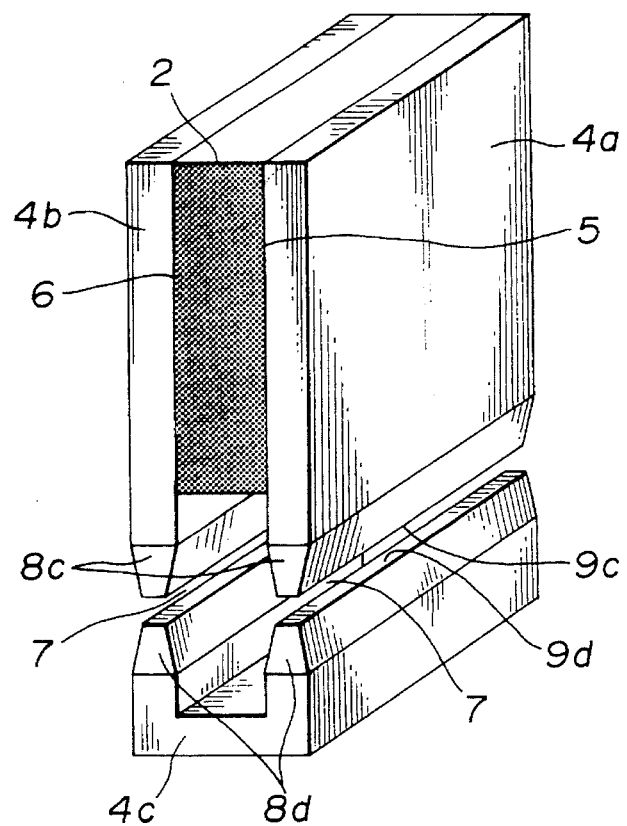

Typical examples of yoke-type permanent magnet are illustrated in FIG. 2(a) and FIG. 2(b).

In the structure shown in FIG. 2(a), erasing is effected as a tape-type magneto-optical recording medium is passed through a gap 7 formed by the end faces 9a, 9b of the tapered portions (trapezoids) 8a, 8b provided at one end of the yoke members 4a, 4b. The other ends of the yoke members 4a, 4b are disposed in contact with the N pole 5 and the S pole 6, respectively, of a permanent magnet 2.

In the structure shown in of FIG. 2(*b*), erasing is effected as a tape-type magneto-optical recording medium is passed through a gap 7 defined by the end faces 9*c* of the tapered portions (trapezoids) 8*c* provided at the free ends of the yoke members 4*a*, 4*b* holding a permanent magnet at the other ends and the corresponding end faces 9*d* of the tapered portions (trapezoids) 8*d* of an independent yoke member 4*c*.

By making the end portion (the portion constituting the gap) of the yoke thinner, it is possible to develop a stronger magnetic field even when the magnetization at the yoke end is saturated.

The bias magnetic field for recording on a magneto-optical disc is usually applied only to the area at and around the portion of the disc irradiated with recording beams.

In the case of magneto-optical tape, since the optical head 12 must be moved through a relatively large distance at high speed, it is required to move the magnetic head 11 at high speed when a bias magnetic field is applied similarly to the case of magneto-optical disc.

Therefore, in the case of magneto-optical tape, it is preferred to apply a bias magnetic field widely over the track on which recording is made by the optical head.

A permanent magnet 11 is preferably used for applying a bias magnetic field for recording as it can simplify the structure of the apparatus.

Unless the leakage field or demagnetizing field of the erasing head is considered, since the cross-sectional area and length of the magnet is in proportion to the magnetic field, if the magnetic field applied is set to be not more than 24 kA/m, preferably not more than 8 kA/m, the magnet 11 used for inducing the medium magnetization can be miniaturized to provide a further benefit. It is most preferred that the external magnetic field is substantially 0 kA/m.

When a recording medium having a relatively high saturation magnetization at around room temperature is used, recording can be made without application of any external magnetic field since the leakage field of the medium itself increases. Use of such a recording medium for conducting recording merely through modulation of light intensity without using any external magnetic field greatly contributes to structural simplification of the recording apparatus.

According to the present invention, as described above, an information recording and readout system with high volume storage density is provided. This system allows compact recording and storage of massive information in various forms such as documents, pictures, sounds, numerical data, etc. Further, since unnecessary information can be erased or-rewritten, the problem of waste disposal is eliminated. Moreover, the recording and readout apparatus embodying the method of the present invention is simplified in structure and can be offered at low cost.

EXAMPLE

The present invention is described more particularly below by showing the examples thereof. It is to be understood, however, that these examples are merely intended to be illustrative and not to be construed as limiting the scope of the invention.

Example 1

On a PET film (thickness: 20 μm, $F_5$ value: 12.5 kg/mm², heat shrinkage: 1.5%, $Ra^A$: 0.002 μm and $Ra^B$: 0.009 μm) were formed successively a 40 nm thick-AlTa alloy layer, a 30 nm thick-TbFeCo amorphous alloy layer and a 70 nm thick-SiN amorphous dielectric layer by sputtering to produce a magneto-optical recording medium.

The magnetization curve of this recording medium was determined by utilizing the Kerr effect. It was found that the magnetization was perfectly reversed in a magnetic field of around 500 kA/m.

The recording and readout performances of the above recording medium were evaluated by sticking the medium on a substrate for a magneto-optical disc, using an evaluation device for magneto-optical discs.

Before fixing the medium to a spindle of the evaluation device, a magnetic field of 500 kA/m was applied vertically to the medium by using the yoke permanent magnet shown in FIG. 2(*a*). Then the medium was fixed to the spindle and turned at a linear speed of 2 m/s while focusing with the optical head to read out the signal. The signal was at the erasing level, indicating that initialization has been duly effected.

Then, with the medium kept turned at a linear speed of 2 m/s, recording and readout were conducted by varying the recording magnetic field. First, recording was carried out under the following conditions: frequency =800 kHz; recording laser pulse width =625 ns; recording laser power =2.5 mW; readout laser power =0.6 mW. As a result, C/N was 48.5 dB when the recording magnetization was zero, C/N was 49.0 dB when the recording magnetization was 8 kA/m, C/N was 49.5 dB when the recording magnetization was 16 kA/m and C/N was 49.5 dB when the recording magnetization was 24 kA/m. In each case, C/N was not less than 45 dB, the threshold level required for digital recording.

After recording, the medium was removed from the spindle and a magnetic field of 500 kA/m was applied by using the yoke permanent magnet shown in FIG. 2(*a*).

Then the medium was again fixed to the spindle and readout of signal was conducted. Signal was at the erasing level same as at the time of initialization, which indicates that erasing has been effected perfectly.

From the foregoing, it has been confirmed that, in recording and readout of a magneto-optical tape, it is possible to effect initialization and erasing by use of a magnetic field alone, with no need of using light beams.

What is claimed is:

1. A magneto-optical recording and reading-out method which comprises making a tape-type magneto-optical recording medium run in front of at least a single pole of a first magnet applying a magnetic field to said medium of not more than 640 kA/m at a position forwards of an optical head relative to the running direction of said recording medium, without contacting said first magnet so as to cross at a substantial right angle to magnetic force lines, thereby initializing said recording medium or erasing information therein, said tape-type magneto-optical recording medium having at least a magneto-optical recording layer on one side of a base film having a thickness of not more than 50 µm; and effecting recording of information onto the recording medium using said optical head under application of an external magnetic field of not more than 24 kA/m produced by a second magnet.

2. The magneto-optical recording and reading-out method according to claim 1, wherein the magnetic field applied to the medium by said first magnet is 40 to 640 kA/m.

3. The magneto-optical recording and reading-out method according to claim 1, wherein said initialization or erasing is effected by making the recording medium run between a N pole and a S pole of said first magnet without contacting said first magnet.

4. The magneto-optical recording and reading-out method according to claim 1, wherein said recording of information is conducted by modulation of light intensity, with the external magnetic field being substantially 0 kA/m.

5. The magneto-optical recording and reading-out method according to claim 1, wherein reading-out is conducted by irradiating beams from the magneto-optical recording layer side of said medium.

6. The magneto-optical recording and reading-out method according to claim 1, wherein said first magnet is a yoke-type paramagnet magnet or electromagnet.

* * * * *